United States Patent
Panasik et al.

(10) Patent No.: US 6,806,830 B2
(45) Date of Patent: Oct. 19, 2004

(54) ELECTRONIC DEVICE PRECISION LOCATION VIA LOCAL BROADCAST SIGNALS

(75) Inventors: Carl M. Panasik, Garland, TX (US); Steven C. Lazar, Plano, TX (US); Madison F. Pedigo, McKinney, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/036,700

(22) Filed: Dec. 31, 2001

(65) Prior Publication Data

US 2003/0122711 A1 Jul. 3, 2003

(51) Int. Cl.[7] ............................................. G01S 3/02
(52) U.S. Cl. ........................ 342/464; 342/386; 342/457
(58) Field of Search ............................... 342/457, 387, 342/385, 386, 464; 455/456.1

(56) References Cited

U.S. PATENT DOCUMENTS

| | | | |
|---|---|---|---|
| 4,555,707 A | 11/1985 | Connelly | |
| 4,652,884 A | 3/1987 | Starker | |
| 5,510,801 A | 4/1996 | Engelbrecht et al. | |
| 6,433,740 B1 * | 8/2002 | Gilhousen | 342/442 |

FOREIGN PATENT DOCUMENTS

| | | |
|---|---|---|
| GB | 2 222 922 A | 3/1990 |
| GB | 2 254 508 A | 10/1992 |

OTHER PUBLICATIONS

"Indoor Geolocation Using OFDM Signals in HIPERLAN/2 Wireless LANs", Xinrong Li, et al., 11th IEEE International Symposium on Personal Indoor and Mobile Radio Communications, PIMRC 2000, Proceedings (Cat. No. 00th8525), Proceedings of 11th International Symposium on Personal, Indoor and Mobile Radio Communication, London, UK, Sept. 18–21, pp. 1449–1453, vol. 2, XPO10520871, 2000, Pisctaway, NJ, USA, IEEE, USA, ISBN: 9–7803–6463–5.

"Positioning Using the ATSC Digital Television Signal", Dr. Matthew Rabinowitz, et al., Rosum Whitepaper, Online! 2001, XP002235053, Retrieved from the Internet: <URL: www.rosum.com/whitepaper 8–7–01.pdf> 'retrieved on Feb. 13, 2003.

EP Abstract / Zusammenfassung/Abrege, 02102666.1.

* cited by examiner

*Primary Examiner*—Theodore M. Blum
(74) *Attorney, Agent, or Firm*—Ronald O. Neerings; Wade James Brady, III; Frederick J. Telecky, Jr.

(57) ABSTRACT

A location determination apparatus, method and system (10, 23, 26, 32, 36, 48, 52, 60, 64, 74, 78, 84, 90, 106) that is an improvement upon existing location determining techniques. The invention enables precision indoor location determination through the use of non-DTV terrestrial broadcast signals (e.g. one way, wide area, dissemination of information)(20), or re-broadcast signals (44, 56, 70, 80) of the proposed (terrestrial based) digital satellite radio relay transmitters (42, 54) to provide position location. This solution does not require a local receiver to correct for long distance propagation dispersion, particularly for the satellite relay, as the digital radio satellites are already synchronized to GPS time. More specifically, the invention discloses two significant location detection concepts: A) local terrestrial transmitters (12) provide information used to determine the location of an electronic apparatus; and B) local re-transmitters of satellite-distributed programming (42, 54) provide information used to determine the location of an electronic apparatus.

26 Claims, 8 Drawing Sheets

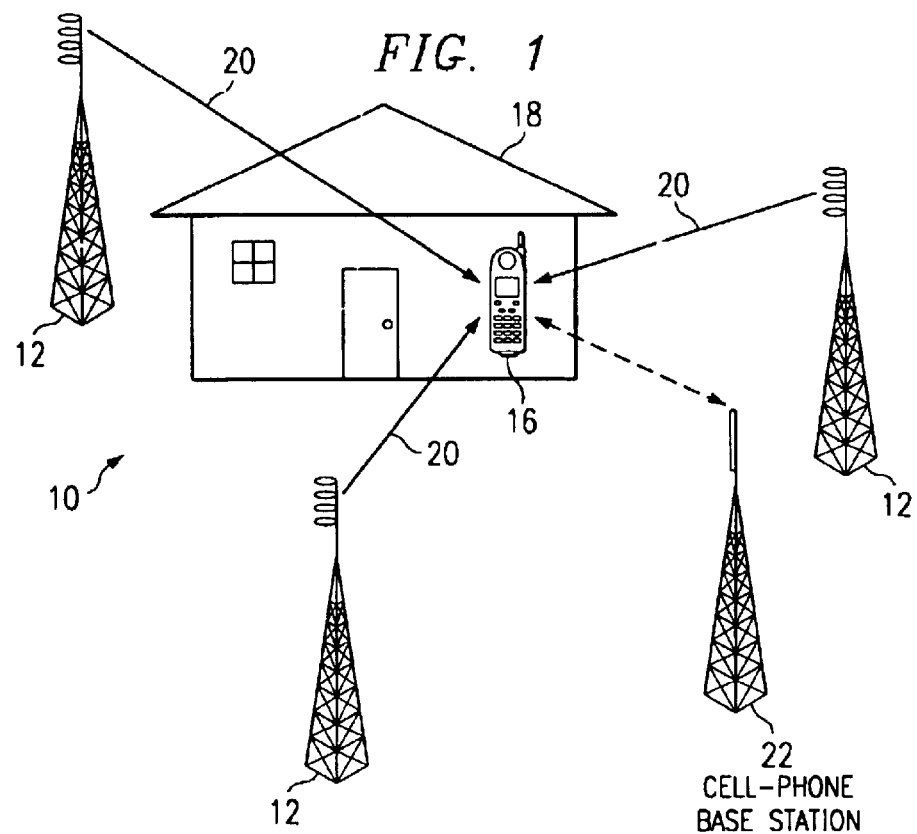
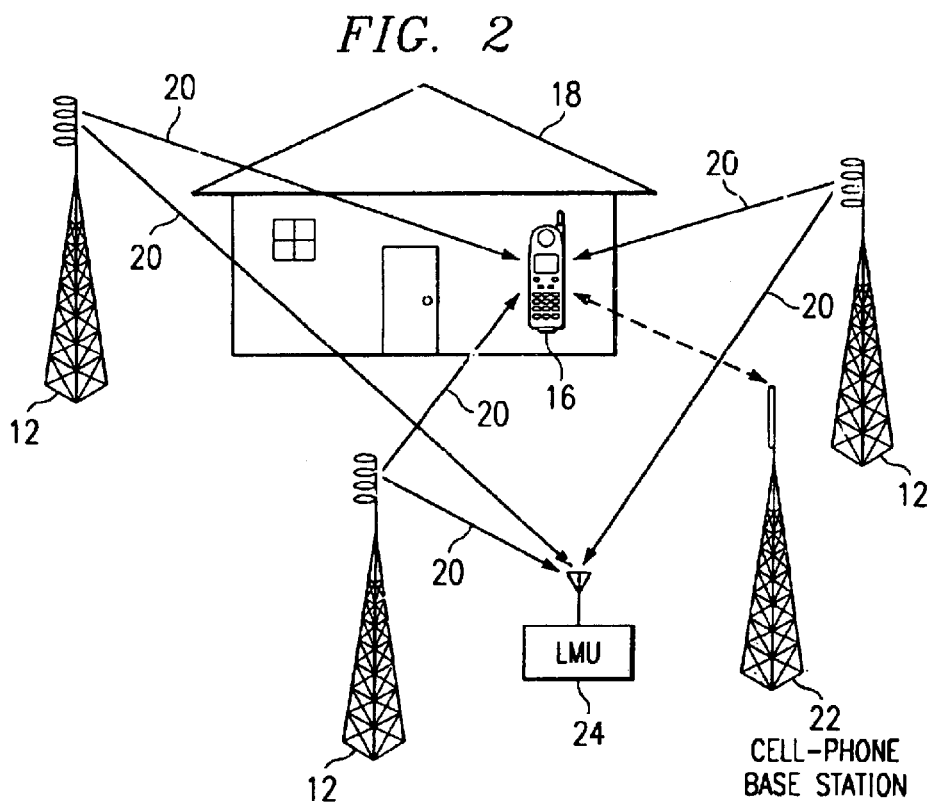

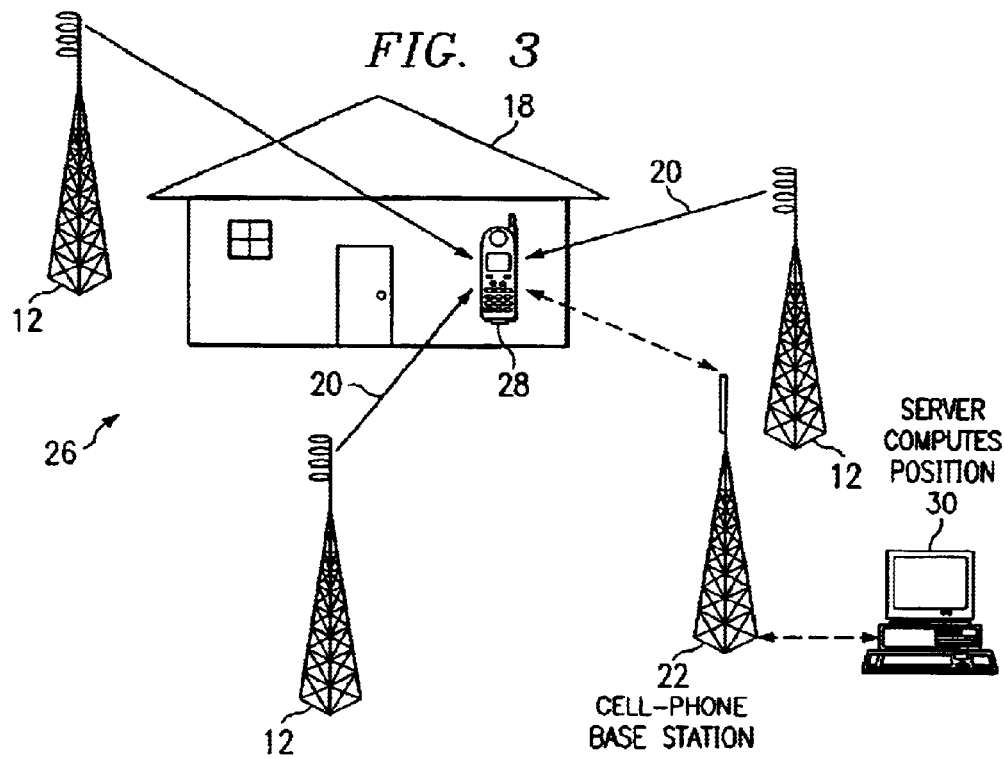
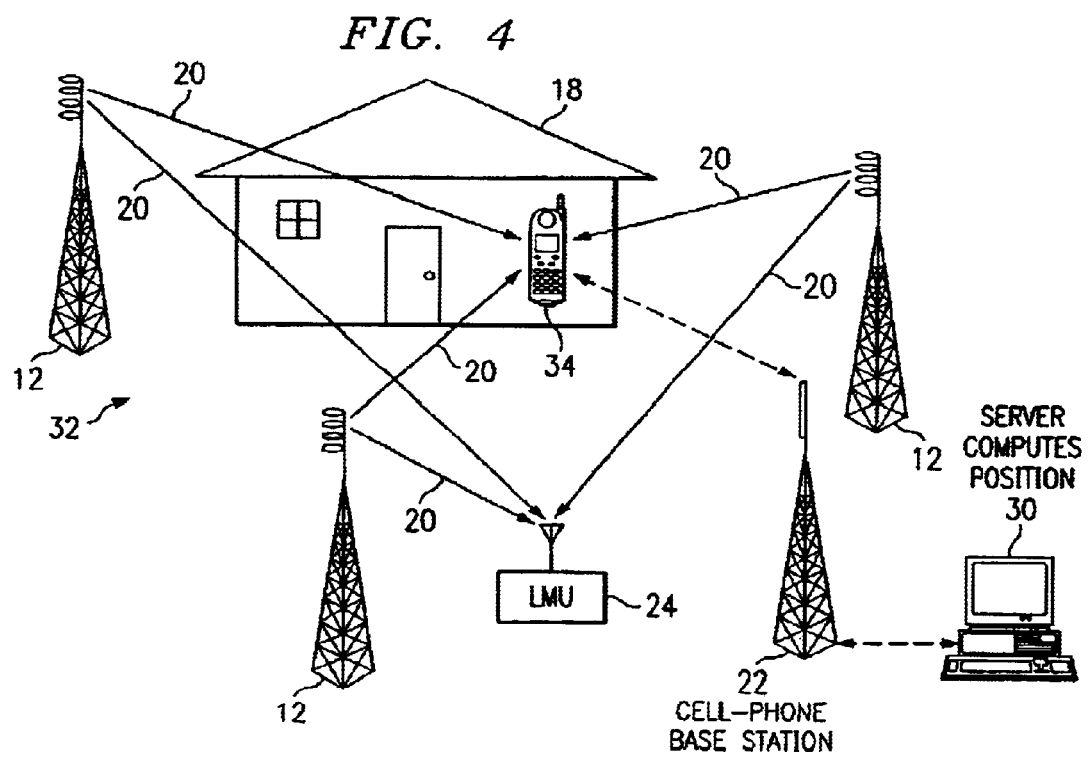

ELECTRONIC DEVICE PRECISION LOCATION VIA LOCAL BROADCAST SIGNALS

TECHNICAL FIELD OF THE INVENTION

This invention relates to precision location of electronic devices. More specifically, the invention relates to a method and apparatus for precision location of electronic devices, particularly indoor, via local broadcast signals.

BACKGROUND OF THE INVENTION

Present techniques for locating electronic devices (e.g., cellular phone, PDA or computer, etc.) including indoor locations (such as shopping malls and office buildings) require either: 1) satellite (global positioning signals "GPS") signals; or 2) GPS and assistance via cellular signals to penetrate building structures, when required; or 3) triangulation using the cellular system. The cell sites are designed to have limited coverage, so finding useful signals from more than two cell sites is unlikely when indoors.

Presently, two major approaches to GPS precision location dominate. The first, a mostly outdoor, satellite vehicle-based Global Positioning System that receives a feeble code division multiple access "CDMA-like" signal from several satellites in which a receiver (using complex search routines and hardware) determines its position via the delay calculated using the received GPS signal phase, the GPS almanac and ephermis. This procedure takes several minutes in weak signal environments. The second is a system that extends the above system through use of additional information supplied via a cellular wireless network.

Snaptrack has disclosed a 'communication' system for providing GPS aiding information useful in the above second system (e.g., see U.S. Pat. Nos. 5,841,396 & 5,874,914). Communication systems require two-way signaling and information transfer. The concept is known as Assisted GPS. The SnapTrack implementation uses a communication system to send the GPS almanac, ephermis and transfer of time from the base station to the mobile. In one mode, intermediate results are returned to the base station (and network) for further processing. With these quantities (GPS hints), the correlating receiver knows what and when to look for the appropriate satellites and can add the successive correlations of several tens of measurements, effectively pulling the feeble buried signal out of the thermal noise.

The United States Government through the Federal Communications Commission "FCC" has mandated a gradual phase-in of location detection technology in cellular phones/systems for emergency 911 applications. Oct. 1, 2001 was the deadline for E911 phase II. In recent months, the Location Based Services Report (LBS Report)(http://pulver.com) has raised concerns that present technologies deployed for 911 would not provide adequate coverage in some indoor environments.

Today, most mobile 911 calls come from callers on the road in open environments where high location accuracy can be achieved. However, as personal communications shift from landline telephones to wireless devices in coming years, people will expect that their wireless appliances will provide them with emergency services at all locations including multi-story buildings, subway stations and similar structures. Sadly, the need for indoors tracking was clearly demonstrated during the tragic events of Sep. 11, 2001 at the New York World Trade Center.

Unfortunately, large steel and concrete buildings, subways and large malls may be difficult or even impossible to cover using traditional wide area location technologies such as AGPS (Assisted GPS) and TDOA (Time Difference of Arrival). Low signal to noise ratio and signal multipath effects in these environments decrease tracking accuracy or even prevent signal acquisition.

Multiple story buildings pose additional obstacles for tracking, as they require three-dimensional positioning. Even if the longitude and latitude of an individual in a fifty-story building were known with great accuracy, that knowledge would be insufficient because the emergency team may have to search every floor. For an accuracy of 200 meters, the location fix may cover many multi-story buildings. Under these conditions, a rescue team could spend hours just searching for the caller.

Many of the major wireless operators chose AGPS solution to meet the E911 Phase II requirements. This technology has several very attractive features. It does not require significant infrastructure changes, and in outdoor rural environments, it offers accuracy that is unsurpassed by any fielded technology. Nevertheless, in some urban settings AGPS may not be reasonably accurate due to multipath, reflected signals.

In evaluating its AGPS tests, Cingular Wireless (Aug. 31, 2001) commented to the FCC, "Although the Snaptrack system (an AGPS solution) performed well in an outdoor environment, indoors test results were extremely poor, effectively negating the outdoor results. Indeed, indoor call yield were so low that meaningful comparison with the Commission's accuracy standards could not be tabulated."

An article in the June 2001 pulver.com Location Based Services Report presented test results of the CoCoSecom AGPS/AFLT (Advanced Forward Link Trilateration) system in Osaka Japan. These results are consistent with Cingular Wireless observation that AGPS provides superior results for outdoor environments and inferior results in indoors settings. The results also indicate that the accuracy of the technology inside large buildings and underground structures would be insufficient to meet the needs of emergency services. It should be noted that CoCoSecom employs QUALCOMM's MSM3300/gpsOne system, which will also be used by some of the US CDMA carriers for their E911 solution.

The issue of indoors tracking has also been addressed by the Coordination Group on Access to Location Information by Emergency Services (CGALIES), whose charter is to explore options for implementing E112 emergency services in the European Union. CGALIES (http://www.telematica.de/cgalies) Work Package1, released on Apr. 19, 2001 states, "A general description of environments where AGPS is typically demonstrated to work well is: outdoors, in car, in wooden buildings, in two story buildings of brick/slate, and in steel/concrete buildings 1–3 meters from a window."

In addition to AGPS, other technologies such as TDOA and E-OTD (Enhanced Observed Time Difference of Arrival), have been adopted by some carriers.

The preceding discussion makes it quite clear that present technologies selected to meet the E911 Phase II requirements do not address the needs of providing emergency services in large buildings, subways and other difficult urban areas. In these areas, even greater accuracies than those mandated by the FCC are needed to reduce response time to 911 calls.

SUMMARY OF THE INVENTION

A location determination apparatus, method and system that is an improvement upon existing location determining techniques. The invention enables precision indoor location determination through the use of non-DTV terrestrial broadcast signals (e.g. one way, wide area, dissemination of information), or re-broadcast signals of the proposed (terrestrial based) digital satellite radio relay transmitters to provide position location. This solution does not require a local receiver to correct for long distance propagation dispersion, particularly for the satellite relay, as the digital radio satellites are already synchronized to GPS time. More specifically, the invention discloses two significant location detection concepts: A) local terrestrial transmitters provide information used to determine the location of an electronic apparatus; and B) local re-transmitters of satellite-distributed programming provide information used to determine the location of an electronic apparatus. Within each of concepts A & B, there are three methods of calculating location position: 1) the handset in a standalone mode measures the time difference of arrival from three or more synchronized transmitters; the handset has a lookup table of the transmitter locations and uses that information to compute latitude and longitude; 2) the handset in an assisted mode receives LMU (local monitoring unit) timing errors of the local transmitters and uses that information along with the previously acquired transmitter locations to calculate latitude and longitude; and 3) the handset in a server based mode receives calculated position information from a server which had received LMU data and local transmitter location and the handset time difference of arrival information.

BRIEF DESCRIPTION OF THE DRAWINGS

For a more complete understanding of the present invention and for further advantages thereof, reference is now made to the following detailed description taken in conjunction with the accompanying drawings in which:

FIG. 1 illustrates a location system based on triangulation of terrestrial broadcast synchronized signals (cell phone includes lookup table for transmitter locations);

FIG. 2 illustrates a location system based on triangulation of terrestrial broadcast un-synchronized signals where a local monitoring unit detects and or measures timing error among the transmitters and provides results to the cell phone for its measurement correction;

FIG. 3 illustrates a location system where the cell phone provides the time difference of arrival to a server that, using a transmitter location look-up table, calculates the position of the cell phone;

FIG. 4 illustrates the system of FIG. 3 where the transmitters are un-synchronized and a local monitoring unit detects and or measures timing error among the transmitters and provides results to the server along with the cell phone's time difference of arrival data for its measurement correction;

DESCRIPTION OF PREFERRED EMBODIMENTS

Figure 5:
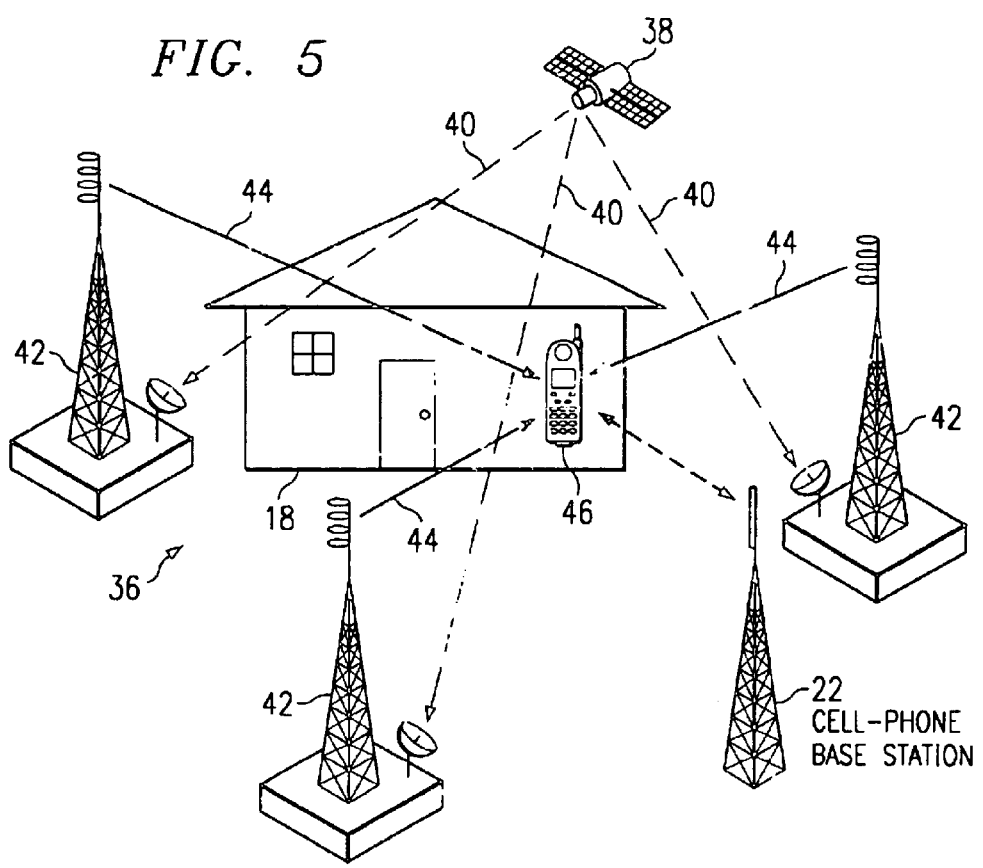
FIG. 5 illustrates a location system based on triangulation of terrestrial re-broadcast of satellite radio synchronized signals from a single provider (cell phone includes lookup table for transmitter locations)

GPS based positioning is not the only possible option for location tracking within buildings. The Rosum Corporation advised the FCC's Wireless Bureau on Jun. 29, 2001, that it is developing location technology based on timing of digital television (DTV) signals from distant cities. In an article on Rosum's website (a copy of which is submitted herewith), Rosum claims that at the receiving end, DTV signals are several orders of magnitude stronger than their GPS counterparts, thus, increasing their availability in indoors environments.

Unfortunately, there is a flaw in Rosum's argument: their system uses the DTV signals from adjacent cities to effect triangulation with sufficient angular spread. These DTV signals are weak and distorted. The DTV sync signal (similar to a cellular pilot signal) is broadcast at over twice the power as the information to insure that the MPEG-2 encoded signal does not loose lock with the transmitter and hence, loose the picture. Rosum claims that the DTV signals are several orders of magnitude stronger than their GPS counterparts. This is true for local stations within a given city. But the CCIR propagation model (which they use) has a propagation loss of $r^{-5}$ beyond 15 km and $r^{-9}$ to the effective horizon. If a 100 kW ERP transmitter (+70 dBm) has a 90 dB loss from a distance city, the effective received power would be −20 dBm. Compared with GPS (−130 dBm) this is a quite a strong signal. The problem is the dispersion of the DTV signal through the atmosphere must be corrected in Rosum's proposed system. GPS uses two frequencies (L1 and L2) to correct for near-line-of-sight propagation dispersion through the atmosphere. Rosum uses a local receiver (similar to the European GSM E-OTD LMU) to correct for propagation errors from distant cities.

Rosum uses DTV signals from asynchronous transmitters in distant cities for two reasons: 1) The digital transmitters do not need to be synchronous since acquisition (changing channels) requires a short time; and 2) The DTV broadcasters have located (and will continue to locate in the future) their antennas on the same towers currently housing antennas for present analog television transmissions.

Unfortunately, in nearly every city, the above-discussed antennas are all in the same location, so triangulation is impossible with local DTV transmitters. One direction is well defined but the other two directions suffer uncertainty due to weak signals from distant (metropolitan area) cities (see FIG. 9 in the referenced Rosum paper). Rosum's solution requires a receiver with a high dynamic range for simultaneous reception of three or more signals. In addition, this receiver would need to reside within the cell phone with a high degree of isolation from the cell phone transmit signal.

A better overall location solution is to use non-DTV terrestrial broadcast signals (e.g. one way, wide area, dissemination of information, which includes such existing broadcast signals as AM and/or FM with digital sub-carrier transmission), or the proposed (terrestrial based) digital satellite radio relay transmitters to provide position location. These transmitters are geographically dispersed about a metropolitan area and provide sufficient angular spread for accurate triangulation. This proposed solution does not require a local receiver to correct for long distance propagation dispersion, particularly for the satellite relay, as the digital radio satellites are already synchronized to GPS time.

Nov-DTV Terrestrial Solution

FIG. 1 illustrates a system 10 that utilizes non-DTV terrestrial broadcast signals (in this embodiment present day AM or FM radio transmitters with digital sub-carrier transmission) 12. A cellular phone 16 (in a building 18 in the embodiment of FIG. 1) detects the digital sub-carrier transmission 20 from at least 3 AM or FM transmitters 12 having their digital sub-carrier transmission signals locked to a common time (be it GPS locked, standard Greenwich, randomly selected, etc.). In this embodiment, cellular phone 16 contains a look-up table with the locations of each of the local AM or FM transmitters 12 having digital sub-carrier transmission (the locations of the local AM or FM transmitters is programmed in a manner similar to programming the characteristics of a carrier's cell-phone base stations). Optionally, it is desirable to include in the phone the ability to update (in response to communicating with the cellular system, when the cell phone roams outside the home area the network downloads a new set of transmitter locations) the local transmitter locations (local being local to the present position of the phone).

Utilizing a common locked time amongst the transmitted various digital sub-carrier signals, the cell phone 16 determines the time difference of arrival of the received signals and combines this information with location information for each of the AM and/or FM transmitters (contained in its look-up table), and thereafter uses any one of several well known triangulation methodologies to determine ranges to three transmitters 12 and the cell phone's 16 latitude, longitude, and clock bias.

The above method for determining location is sufficiently accurate to exceed the FCC's phase II E911 requirements for position determination. Latitude and longitude may also be combined with location coordinates from an altitude map previously stored in the cell phone 16, to refine the three-dimensional position computation for terrestrial locations. In order for the cell phone to compute its location accurately, the timing of the AM or FM radio synchronization code transmissions must be locked to a stable reference.

In a location where there is no common locked time amongst the digital sub-carrier transmissions of local AM or FM transmitters, it is still possible to determine location of cell phones with the addition of a local monitoring unit "LMU" 24 that monitors the digital sub-carriers of local AM and/or FM transmitters 12 (that further determines the difference in time lock amongst the various digital sub-carrier signals), as illustrated in FIG. 2. There are several ways cell phone 16 can be enabled in system 23 to obtain the information from LMU 24. One method has cell phone 16 dialing-up LMU 24 (which may be connected via hardwire to a telephone exchange, or itself have a wireless transceiver) on a periodic basis to download the time differential amongst the various AM and/or FM transmitters in a particular locale (could be updated on an hourly, daily, or weekly basis)(of the reverse could occur LMU 24 dials up cell phone 16 on a periodic basis). Another method has cell phone 16 having a receiver capable of receiving a signal from a transmitter attached to the LMU, which is transmitted on a frequency other than the regular cell phone transmission frequencies. Another method has the LMU sited on or near a cellular tower and its information is exchanged with the cellular network via a cable.

Once the cell phone has the initial time differential amongst the transmitted various digital sub-carrier signals (provided to the cell phone by the LMU), the cell phone 16 determines the time difference of arrival of the signals and combines this information with location information for each of the AM and/or FM transmitters (the locations of the local AM or FM transmitters is programmed into a look up table in a manner similar to programming the characteristics of a carriers cell-phone base stations). Optionally, it is desirable to include in the phone the ability to update (in response to communicating with the cellular system) the local transmitter locations (local being local to the present position of the phone). Thereafter any one of several well-known triangulation methodologies is used to determine pseudoranges to three transmitters 12 and the cell phone's 16 latitude, longitude, and clock bias. The addition of LMU 24 thus enables the use of non-synchronized and non-GPS stable clock references.

FIG. 3 illustrates another embodiment of a system 26 that utilizes present day AM or FM transmitters (with digital sub-carrier transmission) 12. Cellular phone 28 (in a building 18 in the embodiment of FIG. 2) detects the digital sub-carrier transmission from at least 3 AM or FM transmitters 12 and communicates that information to a server 30. Server 30 in communication with cell-phone base station 22 has a look-up table with the locations of each of the local AM or FM transmitters 12 having digital sub-carrier transmission (the locations of the local AM or FM transmitters is programmed in a manner similar to programming the characteristics of a carrier's cell-phone base stations). Optionally, it is desirable to include in the phone the ability to update (in response to communicating with the cellular system) the local transmitter locations (local being local to the present position of the phone). If the transmitters have a common locked time amongst the transmitted various digital sub-carrier signals server 30, having received the time difference of arrival of the digital sub-carrier transmission signals from cell phone 28, combines this information with location information for each of the AM and/or FM transmitters (contained in its look-up table), and thereafter uses any one of several well known triangulation methodologies to determine pseudoranges to the three transmitters 12 and hence, the cell phone 28's latitude, longitude, and clock bias.

FIG. 4 illustrates yet another embodiment of a system 32 that utilizes present day AM or FM transmitters (with digital sub-carrier transmission) 12. Cellular phone 34 (in a building 18 in the embodiment of FIG. 4) detects the digital sub-carrier transmission from at least 3 AM or FM transmitters 12. A server 30 in communication with cell-phone base station 22 has a look-up table with the locations of each of the local AM or FM transmitters 12 having digital sub-carrier transmission (the locations of the local AM or FM transmitters is programmed in a manner similar to programming the characteristics of a carriers cell-phone base stations). Optionally, it is desirable to include in the phone the ability to update (in response to communicating with the cellular system) the local transmitter locations (local being local to the present position of the phone). Unlike the common locked time amongst the transmitted various digital sub-carrier signals of FIG. 3, in this embodiment, there is no common locked time amongst the digital sub-carrier transmissions of local AM or FM transmitters in the embodiment of FIG. 4. It is, however, still possible to determine location of cell phones with the addition of a local monitoring unit "LMU" 24 that monitors the digital sub-carriers of local AM and/or FM transmitters 12 (that further determines the difference in time lock amongst the various digital sub-carrier signals).

There are several ways server 30 can be enabled to obtain the information from LMU 24. One method has server 30 dialing-up LMU 24 (which may be connected via hardwire to a telephone exchange, or itself have a wireless transceiver) on a periodic basis to download the time differential amongst the various AM and/or FM transmitters in a particular local (could be updated on an hourly, daily, or weekly basis)(of the reverse could occur—LMU 24 dials up server 30 on a periodic basis). Another method has server 30 having a receiver capable of receiving a signal from a transmitter attached to the LMU. Thereafter, server 30, having received the time difference of arrival of the digital sub-carrier transmission signals from cell phone 34, combines this information with location information for each of the AM and/or FM transmitters (contained in its look-up table) and the timing error of the transmitters 12 from the LMU 24, and thereafter uses any one of several well known triangulation methodologies to determine pseudoranges to three transmitters 12 and hence, the cell phone 34's latitude, longitude, and clock bias.

Terrestrial Restransmission of Satellite Radio Solution

In another system embodiment, complete coverage of digital satellite radio is enabled by re-broadcast of the digital signal by terrestrial transmitters (ground repeaters) to cover areas of high multi-path, such as 'urban canyons'. Two satellite radio systems to be implemented in the United States can be viewed at http://www.xmradio.com/home.html and http://www.siriusradio.com/mail.htm. Both systems require re-broadcast of the signal via terrestrial system, most likely to be placed at urban locations. Some cities will require more than one terrestrial re-transmitter to sufficiently mitigate the multipath problem throughout the city. This system takes advantage of the many re-transmitters in various location for much improved angular spread.

In the above satellite radio system, the satellite simultaneously feeds the content to a number of relay transmitters located in major urban areas across the country. Each of these transmitters covers a portion of the urban area and supplements the direct line-of-sight satellite coverage in dense urban areas where tall buildings may block the satellite signals. Although the satellite and one or more terrestrial signals are broadcast on the same frequency, they have different scrambling codes so the receiver can distinguish them. This technique is successfully used in CDMA cellular communications. Since the relay transmitters are fed a common signal, all transmitters will be locked to a given satellite time base.

FIG. 5 illustrates a system 36 in which a satellite 38 in geostationary orbit (i.e., 23,000 miles above the surface of the Earth) transmits a radio signal 40 (known as "XM") to satellite radio receivers (not shown) and re-transmitters 42. Re-transmitters 42 boost and re-transmit the signal with different scrambling codes. Contained within the re-transmitted signals 44 are digital synchronization signals containing a common transmitted time lock signal.

A cellular phone 46 (in a building 18 in the embodiment of FIG. 5) detects the digital synchronization transmission 44 from at least 3 re-transmitters 42 having their digital synchronization transmission signals locked to a common time (be it GPS locked, standard Greenwich, randomly selected, etc.). In this embodiment, cellular phone 46 contains a look-up table with the locations of each of the local re-transmitters 42 having digital synchronization transmission (the locations of the local re-transmitters is programmed in a manner similar to programming the characteristics of cell-phone base stations). Utilizing a common locked time amongst the transmitted various digital synchronization signals, the cell phone 46 determines the time difference of arrival of the received signals and combines this information with location information for each of the re-transmitters (contained in its look-up table), and thereafter uses any one of several well known triangulation methodologies to determine pseudoranges to three re-transmitters 42 and hence the cell phone's 46 latitude, longitude, and clock bias.

The above method for determining location is sufficiently accurate to exceed the FCC's phase II E911 requirements for position determination. Latitude and longitude may also be combined with location coordinates from an altitude map previously stored in the cell phone 46, to refine the position computation for terrestrial locations.

Figure 6:
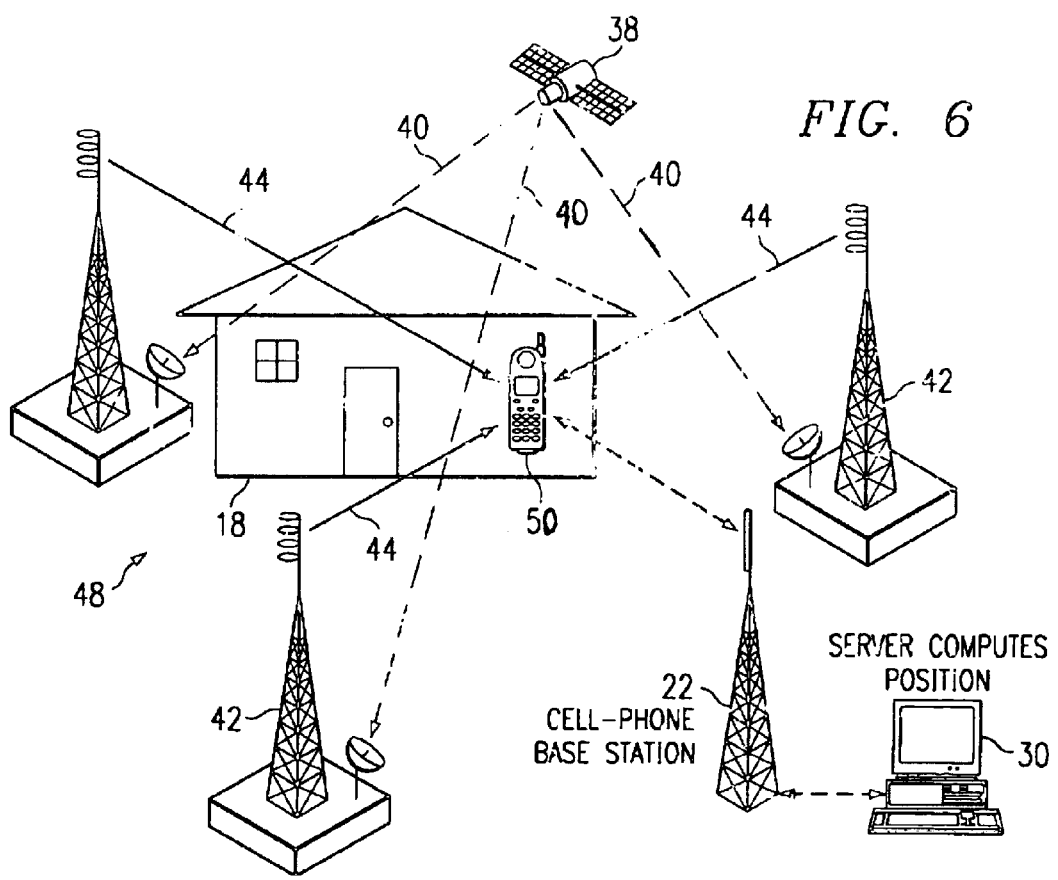
FIG. 6 illustrates the system of FIG. 5 where the cell phone provides the time difference of arrival to a server that, using a transmitter location look-up table, calculates the position of the cell phone.

FIG. 6 illustrates a system 48 in which a satellite 38 in geostationary orbit (i.e., 23,000 miles above the surface of the Earth), transmits a radio signal 40 (known as "XM") to satellite radio receivers (not shown) and re-transmitters 42. Re-transmitters 42 boost and re-transmit the signal with different scrambling codes. Contained within the re-transmitted signals 44 are digital synchronization signals containing a common transmitted time lock signal.

A cellular phone 50 (in a building 18 in the embodiment of FIG. 6) detects the digital synchronization transmission 44 from at least 3 re-transmitters 42 having their digital synchronization transmission signals locked to a common time (be it GPS locked, standard Greenwich, randomly selected, etc.). A server 30 in communication with cell-phone base station 22 has a look-up table with the locations of each of the local re-transmitters 42 having digital synchronization transmission (the locations of the local re-transmitters is programmed in a manner similar to programming the locations of cell-phone base stations). Utilizing a common locked time amongst the transmitted various digital synchronization signals provided by the satellite, server 30, having received the time difference of arrival of the digital sub-carrier transmission signals from cell phone 50, combines this information with location information for each of the re-transmitters (contained in its look-up table), and the transmitter locations and thereafter uses any one of several well known triangulation methodologies to determine pseudoranges to three re-transmitters 42 and hence, the cell phone 50's latitude, longitude, and clock bias.

Figure 7:
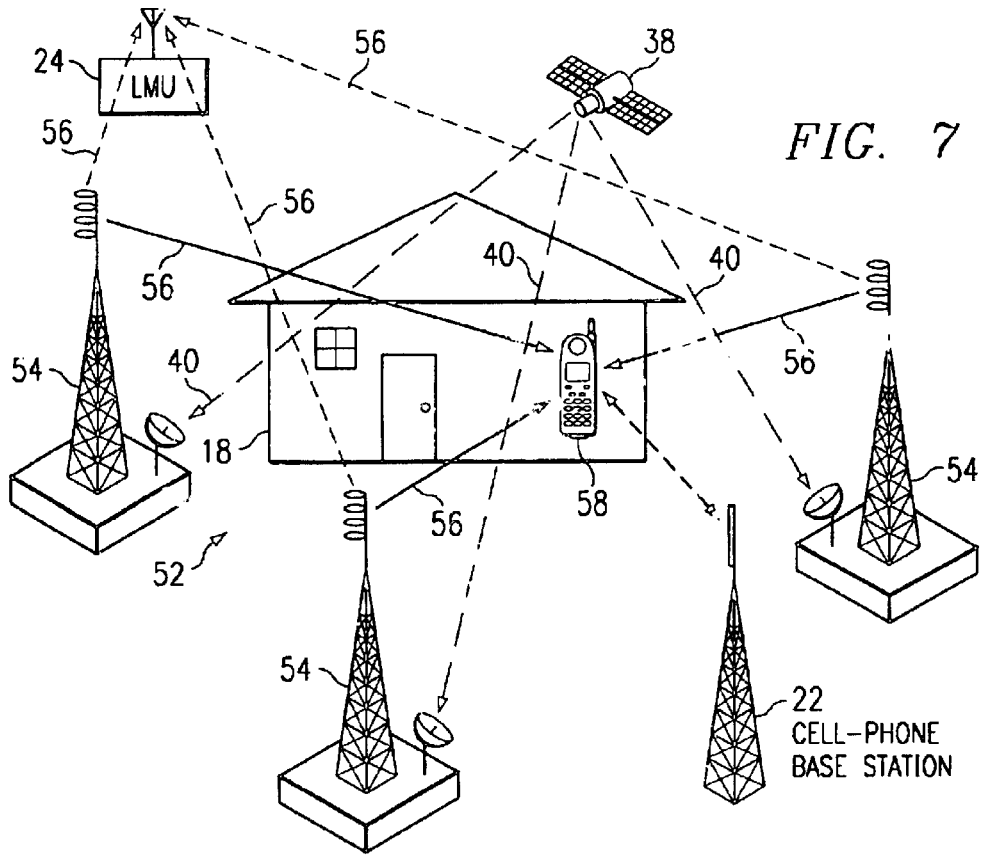
FIG. 7 illustrates the system of FIG. 5 where the transmitters are un-synchronized and a local monitoring unit detects and or measures timing error among the transmitters and provides results to the server along with the cell phone's time difference of arrival data for its measurement correction.

FIG. 7 illustrates a system 52 in which a satellite 38 in geostationary orbit (i.e., 23,000 miles above the surface of the Earth), transmits a radio signal 40 (known as "XM") to satellite radio receivers (not shown) and re-transmitters 54. Re-transmitters 54 boost and re-transmit the signal with different scrambling codes. Contained within the re-transmitted signals 56 are digital synchronization signals that do not contain a common transmitted time lock signal.

In system 52 where there is no common locked time amongst the digital synchronization transmissions 56 of re-transmitters 54, it is still possible to determine location of cell phones with the addition of a local monitoring unit "LMU" 24 that monitors the transmitted digital synchronization signals of re-transmitters 54 (that further determines the difference in time lock amongst the various digital sub-carrier signals), as illustrated in FIG. 7. As long as the separate transmitters are reasonably stable, the LMU can update the clock drifts of the terrestrial transmitters.

There are several ways cell phone 58 can be enabled to obtain the information from LMU 24. One method has cell phone 58 dialing-up LMU 24 (which may be connected via hardwire to a telephone exchange, or itself have a wireless transceiver) on a periodic basis to download the time differential amongst the various re-transmitters in a particular local (could be updated on an hourly, daily, or weekly basis)(of the reverse could occur—LMU 24 dials up cell phone 58 on a periodic basis). Another method has cell phone 58 having a receiver capable of receiving a signal from a transmitter attached to the LMU, which is transmitted on a frequency other than the regular cell phone transmission frequencies. Yet another method has the LMU sited on or near a cellular tower and its information is exchanged with the cellular network via a cable.

Once the cell phone has the initial time differential amongst the transmitted various digital synchronization signals (provided to the cell phone by the LMU), the cell phone 58 determines the time difference of arrival of the signals and combines this information with location information for each of the re-transmitters (contained in its look-up table), and thereafter uses any one of several well known triangulation methodologies to determine ranges to three re-transmitters 54 and the cell phone's 58 latitude, longitude, and clock bias. The addition of LMU 24 thus enables the use of non-GPS stable clock references.

Figure 8:
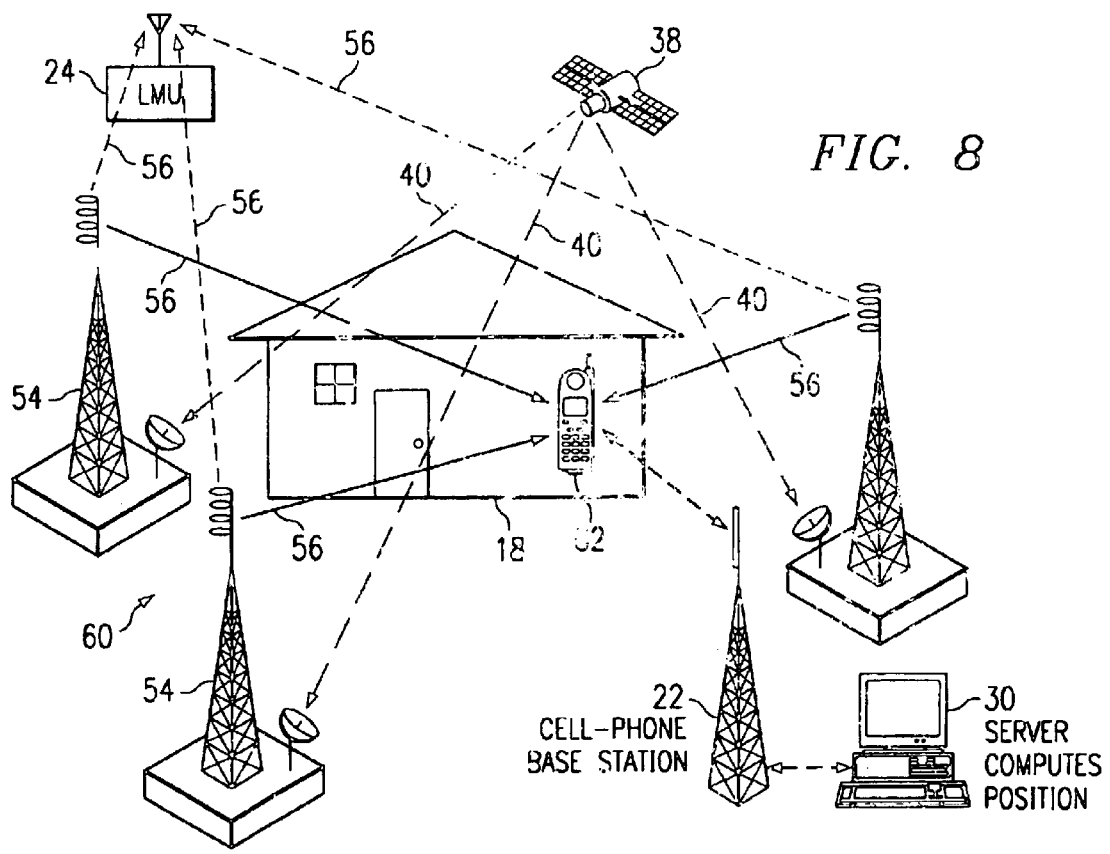
FIG. 8 illustrates the system of FIG. 7, where the cell phone provides the time difference of arrival to a server that, using a transmitter location look-up table, and information from the local monitoring unit, calculates the position of the cell phone.

FIG. 8 illustrates a system 60 in which a satellite 38 in geostationary orbit (i.e., 23,000 miles above the surface of the Earth), transmits a radio signal 40 (known as "XM") to satellite radio receivers (not shown) and re-transmitters 54. Re-transmitters 54 boost and re-transmit the signal with different scrambling codes. Contained within the re-transmitted signals 56 are digital synchronization signals that do not contain a common transmitted time lock signal.

In system 60 where there is no common locked time amongst the digital synchronization transmissions 56 of re-transmitters 54, it is still possible to determine location of cell phones with the addition of a local monitoring unit "LMU" 24 that monitors the transmitted digital synchronization of re-transmitters 54 (that further determines the difference in time lock amongst the various digital signals), as illustrated in FIG. 8.

There are several ways server 30 can be enabled to obtain the information from LMU 24. One method has server 30 dialing-up LMU 24 (which may be connected via hardwire to a telephone exchange, or itself have a wireless transceiver) on a periodic basis to download the time differential amongst the various re-transmitters in a particular local (could be updated on an hourly, daily, or weekly basis)(of the reverse could occur—LMU 24 dials up server 30 on a periodic basis). Another method has server 30 having a receiver capable of receiving a signal from a transmitter attached to the LMU. Another method has the LMU sited on or near a cellular tower and its information is exchanged with the cellular network via a cable.

Once the server has the baseline time differential amongst the transmitted various digital synchronization signals 56 (provided to the server directly by the LMU), the server 30 uses the time difference of arrival of the signals received and forwarded by cell phone 62 and combines this information with location information for each of the re-transmitters (contained in its look-up table), and thereafter uses any one of several well known triangulation methodologies to determine pseudoranges to three re-transmitters 54 from cell phone 62 and the cell phone's 62 latitude, longitude, and clock bias. The addition of LMU 24 thus enables the use of non-GPS stable clock references for the re-transmitters.

Figure 9:
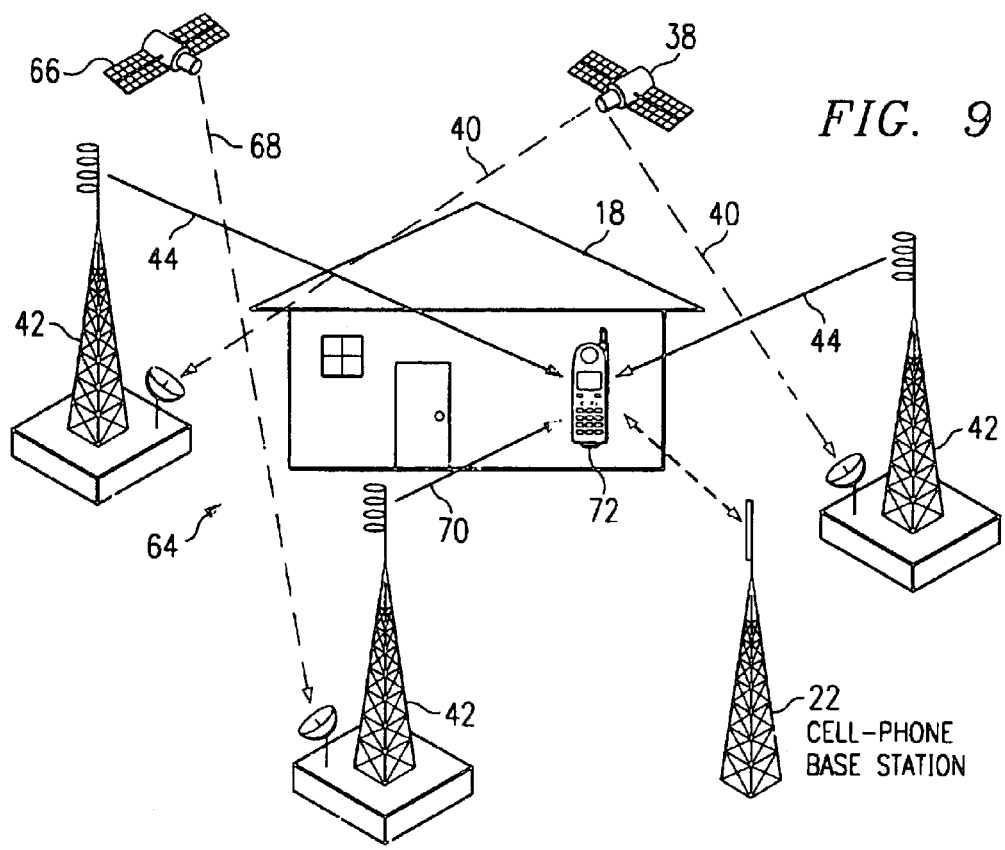
FIG. 9 illustrates the system of FIG. 5, where there is more than one provider (e.g., satellites) of digital satellite radio.

FIG. 9 illustrates a system 64 in which at least two satellites 38 and 66 in geostationary orbit (i.e., 23,000 miles above the surface of the Earth), transmit radio signals 40 and 68 (known as "XM" and "Sirrus") to satellite radio receivers (not shown) and re-transmitters 42. Re-transmitters 42 boost and re-transmit the signals with different scrambling codes. Contained within the re-transmitted signals 44 and 70 are digital synchronization signals containing a common transmitted time lock signal.

A cellular phone 72 (in a building 18 in the embodiment of FIG. 9) detects the digital synchronization transmissions 44 and 70 from at least 3 re-transmitters 42 having their digital synchronization transmission signals locked to a common time (be it GPS locked, standard Greenwich, randomly selected, etc.), provided by the satellite ground station. In this embodiment, cellular phone 72 contains a look-up table with the locations of each of the local re-transmitters 42 having digital synchronization transmission (the locations of the local re-transmitters are programmed in a manner similar to programming the characteristics of cell-phone base stations). Utilizing a common locked time amongst the transmitted various digital signals, the cell phone 72 determines the time difference of arrival of the received signals and combines this information with location information for each of the re-transmitters (contained in its look-up table), and thereafter uses any one of several well known triangulation methodologies to determine pseudoranges to three re-transmitters 42 and the cell phone's 72 latitude, longitude, and clock bias.

The above method for determining location is sufficiently accurate to exceed the FCC's phase II E911 requirements for position determination. Latitude and longitude may also be combined with location coordinates from an altitude map previously stored in the cell phone 72, to refine the position computation for terrestrial locations.

Figure 10:
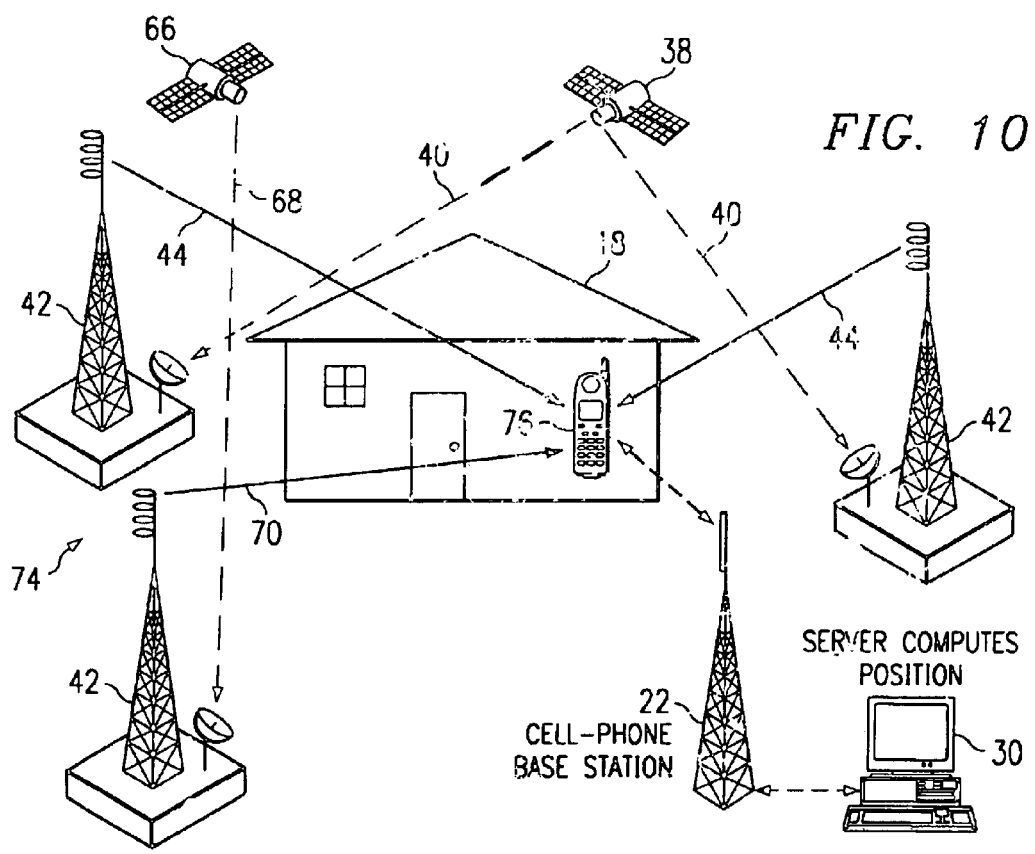
FIG. 10 illustrates the system of FIG. 6, where there is more than one provider (e.g., satellites) of digital satellite radio.

FIG. 10 illustrates a system 74 in which satellites 38 and 66 in geostationary orbit (i.e., 23,000 miles above the surface of the Earth), transmit radio signals 40 and 68 (known as "XM") to satellite radio receivers (not shown) and re-transmitters 42. Re-transmitters 42 boost and re-transmit the signal with different scrambling codes. Contained within the re-transmitted signals 44 and 70 are digital synchronization signals containing a common transmitted time lock signal.

A cellular phone 76 (in a building 18 in the embodiment of FIG. 10) detects the digital synchronization transmissions 44 and 70 from at least 3 re-transmitters 42 having their digital synchronization transmission signals locked to a common time (be it GPS locked, standard Greenwich, randomly selected, etc.). A server 30 in communication with cell-phone base station 22 has a look-up table with the locations of each of the local re-transmitters 42 having digital synchronization transmission (the locations of the local re-transmitters is programmed in a manner similar to programming the characteristics of cell-phone base stations). Utilizing a common locked time amongst the transmitted various digital signals (provided via satellite ground stations) server 30, having received the time difference of arrival of the digital sub-carrier transmission signals from cell phone 76, combines this information with location information for each of the re-transmitters (contained in its look-up table) and the transmitter locations, and thereafter uses any one of several well known triangulation methodologies to determine pseudoranges to three re-transmitters 42 and the cell phone 76's latitude, longitude, and clock bias.

Figure 11:
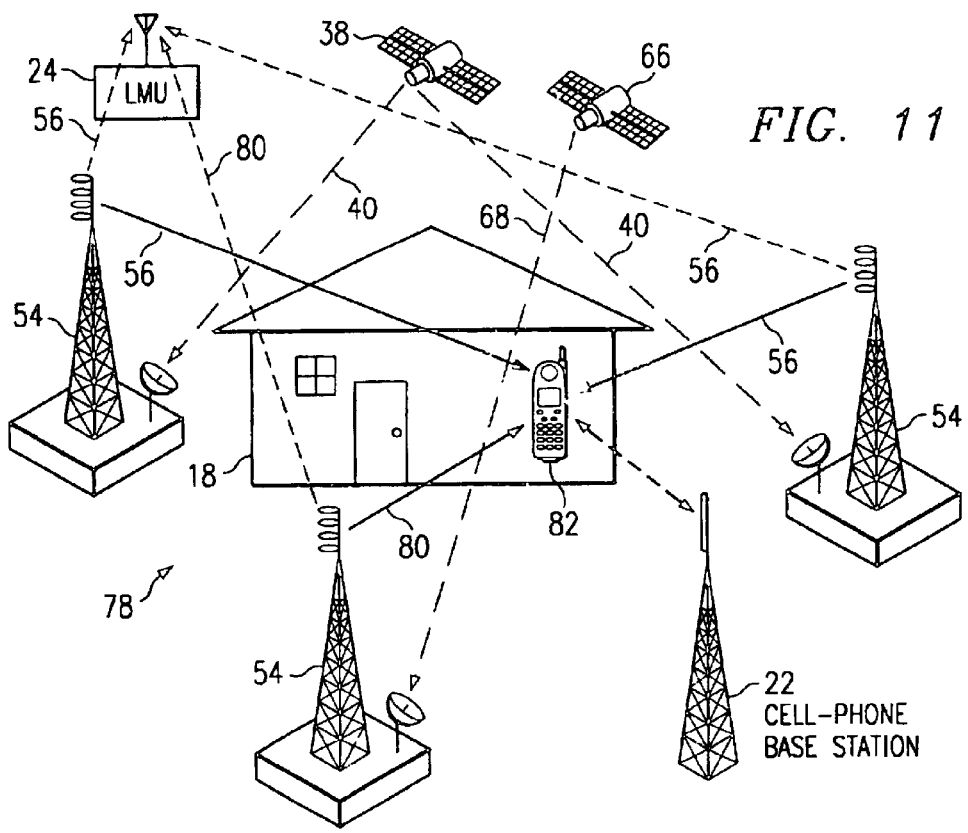
FIG. 11 illustrates the system of FIG. 7, where there is more than one provider (e.g., satellites) of digital satellite radio.

FIG. 11 illustrates a system 78 in which satellites 38 and 66 in geostationary orbit (i.e., 23,000 miles above the surface of the Earth), transmit radio signals 40 and 68 (known as "XM") to satellite radio receivers (not shown) and re-transmitters 54. Re-transmitters 54 boost and re-transmit the signal with different scrambling codes. Contained within the re-transmitted signals 56 and 80 are digital synchronization signals that do not contain a common transmitted time lock signal.

In system 78 where there is no common locked time amongst the digital synchronization transmissions 56 and 80 of re-transmitters 54, it is still possible to determine location of cell phones with the addition of a local monitoring unit "LMU" 24 that monitors the transmitted digital synchronization of re-transmitters 54 (that further determines the difference in time lock amongst the various digital sub-carrier signals), as illustrated in FIG. 11. There are several ways cell phone 82 can be enabled to obtain the information from LMU 24. One method has cell phone 82 dialing-up LMU 24 (which may be connected via hardwire to a telephone exchange, or itself have a wireless transceiver) on a periodic basis to download the time differential amongst the various re-transmitters in a particular local (could be updated on an hourly, daily, or weekly basis)(of the reverse could be—LMU 24 dials up cell phone 82 on a periodic basis). Another method has cell phone 82 having a receiver capable of receiving a signal from a transmitter attached to the LMU, which is transmitted on a frequency other than the regular cell phone transmission frequencies or the LMU could be wired to a cellular network.

Once the cell phone has the initial time differential amongst the re-transmitted various digital synchronization signals (provided to the cell phone by the LMU), the cell phone 82 determines the time difference of arrival of the signals and combines this information with location information for each of the re-transmitters (contained in its look-up table), and thereafter uses any one of several well known triangulation methodologies to determine pseudoranges to three re-transmitters 54 and the cell phone's 82 latitude, longitude, and clock bias. The addition of LMU 24 thus enables the use of non-GPS stable clock references. LMU 24 may further be used for correcting satellite propagation errors (including changes caused by weather conditions).

Figure 12:
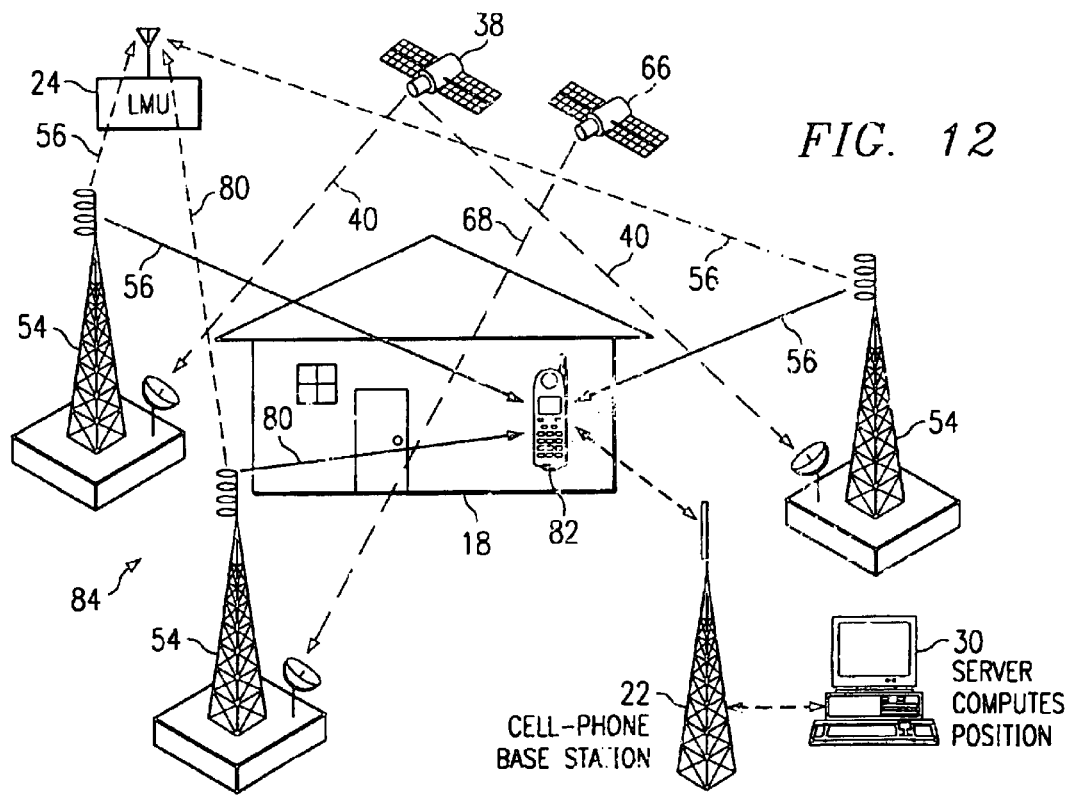
FIG. 12 illustrates the system of FIG. 8, where there is more than one provider (e.g., satellites) of digital satellite radio.

FIG. 12 illustrates a system 84 in which satellites 38 and 66 in geostationary orbit (i.e., 23,000 miles above the surface of the Earth), transmit radio signals 40 and 68 (known as "XM" and "Sirrus") to satellite radio receivers (not shown) and re-transmitters 54. Re-transmitters 54 boost and re-transmit the signal with different scrambling codes. Contained within the re-transmitted signals 56 and 80 are digital sub-carrier signals that do not contain a common transmitted time lock signal.

In system 84 where there is no common locked time amongst the digital sub-carrier transmissions 56 and 80 of re-transmitters 54, it is still possible to determine location of cell phones with the addition of a local monitoring unit "LMU" 24 that monitors the transmitted digital sub-carriers of re-transmitters 54 (that further determines the difference in time lock amongst the various digital synchronization signals), as illustrated in FIG. 12 There are several ways server 30 can be enabled to obtain the information from LMU 24. One method has server 30 dialing-up LMU 24 (which may be connected via hardwire to a telephone exchange, or itself have a wireless transceiver) on a periodic basis to download the time differential amongst the various re-transmitters in a particular local (could be updated on an hourly, daily, or weekly basis)(of the reverse could occur—LMU 24 dials up server 30 on a periodic basis). Another method has server 30 having a receiver capable of receiving a signal from a transmitter attached to the LMU or the LMU could be wired to a cellular network.

Once the server has the initial time differential amongst the transmitted various digital synchronization signals 56 and 80 (provided to the server directly by the LMU), the server 30, having received the time difference of arrival of the digital synchronization signals from cell phone 88, combines this information with location information for each of the re-transmitters (contained in its look-up table), and thereafter uses any one of several well known triangulation methodologies to determine pseudoranges to three re-transmitters 54 from cell phone 88 and the cell phone's 88 latitude, longitude, and clock bias. The addition of LMU 24 thus enables the use of non-GPS stable clock references. LMU 24 may further be used for correcting satellite propagation errors (including changes caused by weather conditions).

Figure 13:
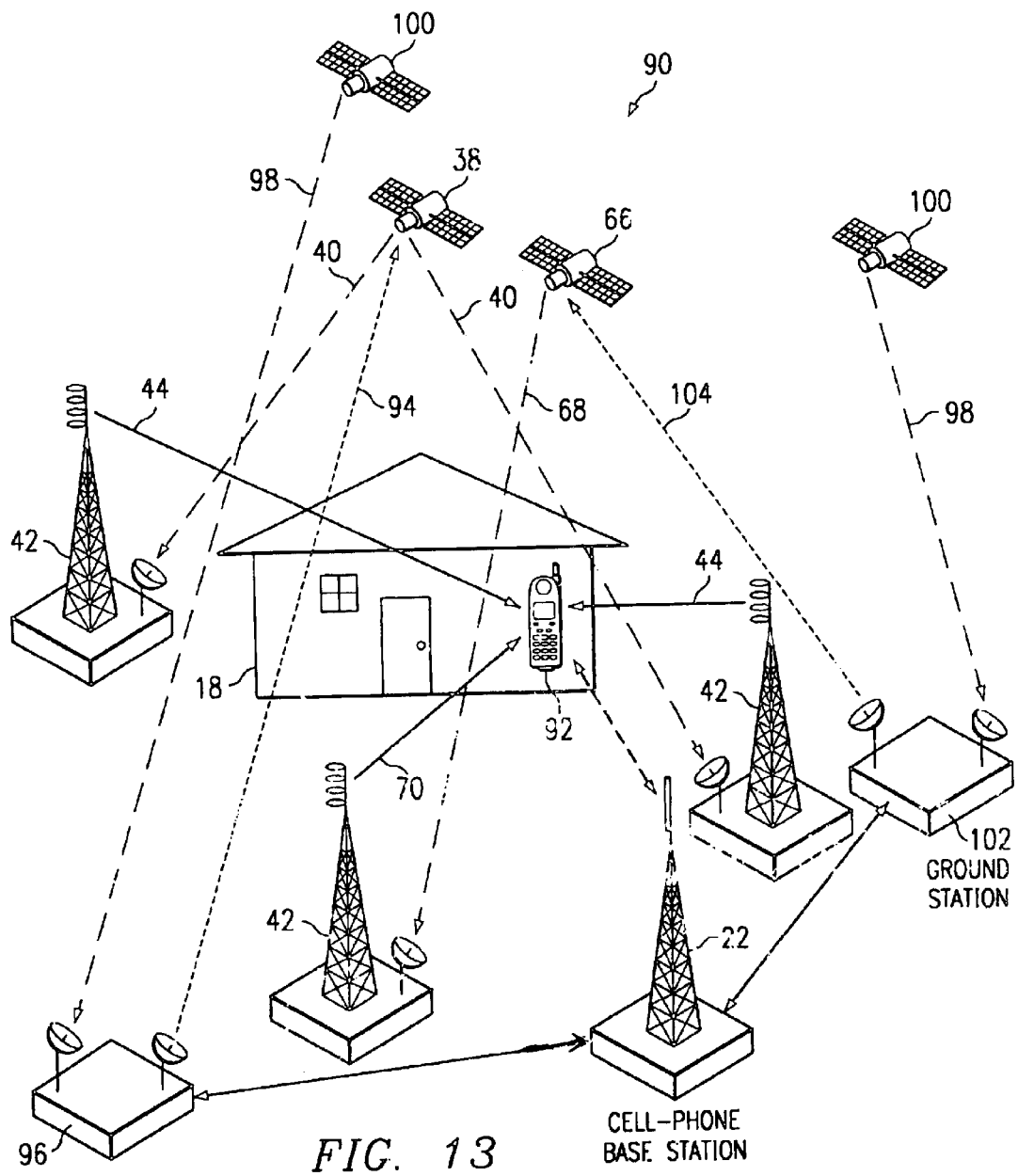
FIG. 13 illustrates the system of FIG. 10, with satellite synchronization provided by a GPS-like system.

FIG. 13 illustrates a system 90 in which satellites 38 and 66 in geostationary orbit (i.e., 23,000 miles above the surface of the Earth), transmit radio signals 40 and 68 (known as "XM" and "Sirrus") to satellite radio receivers (not shown) and re-transmitters 42. Re-transmitters 42 boost and re-transmit the signal with different scrambling codes. Contained within the re-transmitted signals 44 and 70 are digital synchronization signals that contain a common transmitted time lock signal resulting from a GPS time lock signal 98 being sent to satellite 38 (transmitting "XM" digital radio signal) from earth station 96 from uplink 94 and a GPS time lock signal 98 being sent to satellite 66 (transmitting "Sirrus" digital radio signal) from earth station 102 via (GPS time lock signal 98 from) uplink 104.

A cellular phone 92 (in a building 18 in the embodiment of FIG. 13) detects the digital synchronization transmissions 42 and 70 from at least 3 re-transmitters 42 having their digital synchronization transmission signals locked to GPS common time. In this embodiment, cellular phone 92 contains a look-up table with the locations of each of the local re-transmitters 42 having digital synchronization transmission (the locations of the local re-transmitters are programmed in a manner similar to programming the locations of cell-phone base stations). Utilizing a common locked time amongst the transmitted various digital synchronization signals, the cell phone 92 determines the time difference of arrival of the received signals and combines this information with location information for each of the re-transmitters (contained in its look-up table), and thereafter uses any one of several well known triangulation methodologies to determine ranges to the three re-transmitters 42 and the cell phone's 92 latitude, longitude, and clock bias.

The above method for determining location is sufficiently accurate to exceed the FCC's phase II E911 requirements for position determination. Latitude and longitude may also be combined with location coordinates from an altitude map previously stored in the cell phone 92, to refine the position computation for terrestrial locations.

Figure 14:
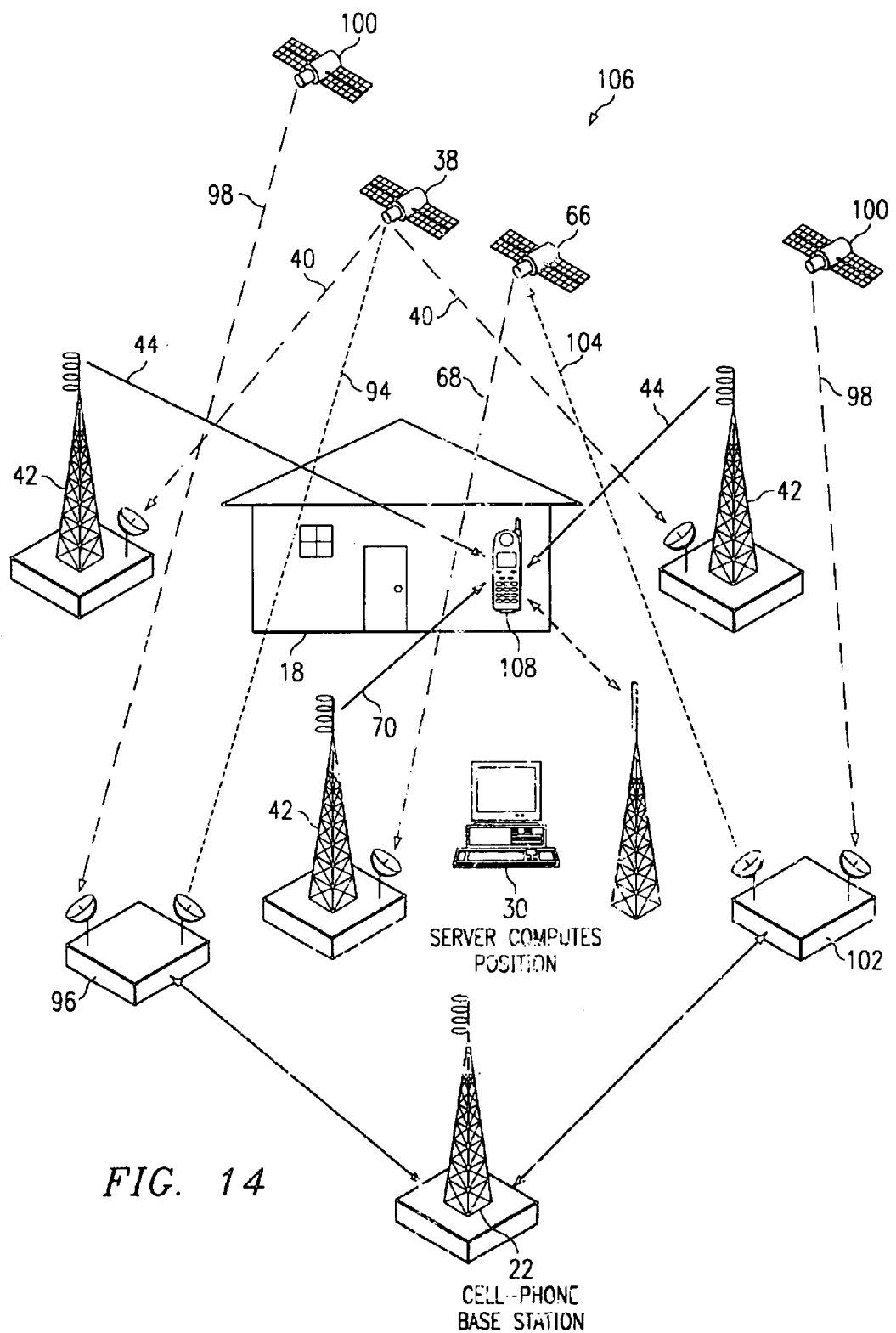
FIG. 14 illustrates the system of FIG. 13, where the cell phone provides the time difference of arrival to a server that, using a transmitter location look-up table, calculates the position of the cell phone.

FIG. 14 illustrates a system 106 in which satellites 38 and 66 in geostationary orbit (i.e., 23,000 miles above the surface of the Earth), transmit radio signals 40 and 68 (known as "XM") to satellite radio receivers (not shown) and re-transmitters 42. Re-transmitters 42 boost and re-transmit the signal with different scrambling codes. Contained within the re-transmitted signals 44 and 70 are digital synchronization signals that contain a common transmitted time lock signal resulting from a GPS time lock signal 98 being sent to satellites 38 and 66 from uplink 94 and 104, respectively. Earth stations 96 and 102 receive a GPS time lock signal 98 from GPS satellite 100.

A cellular phone 108 (in a building 18 in the embodiment of FIG. 14) detects the digital synchronization transmissions 44 and 70 from at least 3 re-transmitters 42 having their digital synchronization transmission signals locked to GPS common time. In this embodiment, server 30 contains a look-up table with the locations of each of the local re-transmitters 42 having digital synchronization transmission (the locations of the local re-transmitters is programmed in a manner similar to programming the characteristics of cell-phone base stations). Utilizing a common locked time amongst the transmitted various digital synchronization signals, the cell phone 108 determines the time difference of arrival of the received signals and combines this information with location information for each of the re-transmitters (contained in its look-up table), and thereafter uses any one of several well known triangulation methodologies to determine pseudoranges to three re-transmitters 54 and the cell phone's 102 latitude, longitude, and clock bias.

The server 30, having received the time difference of arrival of the digital sub-carrier transmission signals from cell phone 108, combines this information with location information for each of the re-transmitters (contained in its look-up table), and thereafter uses any one of several well known triangulation methodologies to determine pseudoranges to three re-transmitters 42 from cell phone 108 and the cell phone's 108 latitude, longitude, and clock bias.

The above method for determining location is sufficiently accurate to exceed the FCC's phase II E911 requirements for position determination. Latitude and longitude may also be combined with location coordinates from an altitude map previously stored in the cell phone 108, to refine the position computation for terrestrial locations.

The following are significant advantages of the proposed system:

The broadcast signals have a significantly higher electric field indoors than GPS or cellular signals, so their coverage extends to the indoor environment.

The cellular transmitters are intentionally limited to a cell, hence triangulation of three or more cellular transmitters is restricted if not impossible.

Transmitter locations for television tend to be located together for the advantage of the broadcaster and the user. In contrast, transmitter locations for radio are location diverse and provide better opportunities for triangulation through large angular spread.

The re-transmitted digital radio signals are much stronger than the distant city DTV signals.

No correction for 10's of km propagation dispersion (through atmosphere) is needed.

In cities where there are only two re-transmit sites, a lookup table (similar to Qualcomm's Omnitracs) can be used to discard the outdoor solution and choose the correct indoor solution for weak signals.

Low-cost receivers will make this a competitive solution compared to the ultra-high sensitivity required with GPS.

Assistance of GPS almanac and ephermis is not required for indoor location, hence system is amicable to European carriers leading to a worldwide market.

It is unlikely that the two satellite systems' re-transmitter antennas will be co-located on the same building, just as competing cellular service providers use individual towers.

In conclusion, two significant location detection concepts have been discussed: A) local terrestrial transmitters provide information used to determine the location of an electronic apparatus; and B) local re-transmitters of satellite-distributed programming provide information used to determine the location of an electronic apparatus. Within each of concepts A & B, there are three methods of calculating location position: 1) the handset in a standalone mode measures the time difference of arrival from three or more synchronized transmitters; the handset has a lookup table of the transmitter locations and uses that information to compute latitude and longitude; 2) the handset in an assisted mode receives LMU timing errors of the local transmitters and uses that information along with the previously acquired transmitter locations to calculate latitude and longitude; and 3) the handset in a server based mode receives calculated position information from a server which had received LMU data and local transmitter location and the handset time difference of arrival information.

While the invention has been described in the context of preferred embodiments, it will be apparent to those skilled in the art that the present invention may be modified in numerous ways and may assume many embodiments other than those specifically set out and described above. For example, the invention contemplates that a PDA, portable computer, computer, calculator, medical monitor, entertainment device, automotive navigation system or other electronic device, with at least an RF receiver, could be used in addition to, or in lieu of, the cellular telephone described above. Similarly, while the embodiments of the invention described above disclose local broadcast signals in the form of AM and/or FM broadcast signals with digital sub-carrier transmission and locally retransmitted satellite signals with digital synchronization signals, the invention contemplates that other broadcast signals (assuming they have sufficient bandwidth to transfer precision time) could be used in lieu thereof—for example, wireless local loop, wireless metropolitan area network "WMAN", satellite television, public safety radio networks, private dispatch system, etc. Accordingly, it is intended by the appended claims to cover all modifications of the invention that fall within the true spirit and scope of the invention.

What is claimed is:

1. A position location system, comprising:
   non-DTV broadcast signals transmitted from known transmitter locations, said broadcast signals each including a synchronization signal locked to a common time; and
   an apparatus for receiving said broadcast signals and calculating the location of said apparatus using time differences detected amongst respective ones of said received synchronization signals.

2. The system of claim 1, wherein said broadcast signals are analog signals with digital sub-carrier signals.

3. The system of claim 1, wherein said broadcast signals are digital signals.

4. The system of claim 3, wherein said digital signals are re-transmissions of satellite radio signals.

5. The system of claim 1, wherein said apparatus is a cellular transceiver.

6. The system of claim 5, wherein said cellular transceiver is a personal communicator.

7. The system of claim 1, wherein said apparatus receives broadcast signals from at least three transmitter locations.

8. The system of claim 1, wherein correction of non-time locked broadcast signals is provided by a local monitoring unit "LMU".

9. A position location system, comprising:
broadcast signals with common synchronization from at least one satellite and rebroadcast from three or more known terrestrial re-transmitter locations; and
an apparatus for receiving said rebroadcast signals and calculating the location of said apparatus using time differences detected in synchronization between respective ones of said received rebroadcast signals.

10. A method for locating an electronic device, comprising the steps of:
receiving non-DTV broadcast signals transmitted from known transmitter locations, said broadcast signals each having a synchronization signal locked to a common time when transmitted; and
calculating the location of said electronic device using time differences detected amongst respective ones of said synchronization signals in said received broadcast signals.

11. The method of claim 10, wherein said broadcast signals are analog signals with digital sub-carrier signals.

12. The method of claim 10, wherein said broadcast signals are digital signals.

13. The method of claim 12, wherein said digital signals are re-transmissions of satellite radio signals.

14. The method of claim 12, wherein said receiving non-DTV broadcast signals is enabled by an RF receiver in said electronic device.

15. The method of claim 10, wherein said electronic device is a cellular handset.

16. The method of claim 10, wherein said electronic device receives broadcast signals from at least three transmitter locations.

17. The method of claim 10, wherein correction of non-time locked broadcast signals is provided by a local monitoring unit "LMU".

18. A method for locating an electronic device, comprising the steps of:
receiving broadcast signals from three or more terrestrial transmitter locations, each of said broadcast signals being a retransmission with common synchronization of a signal previously transmitted by a satellite; and
calculating the location of said electronic device using time differences detected in synchronization between respective ones of said received broadcast signals.

19. An electronic apparatus enabled to receive non-DTV broadcast signals transmitted from known transmitter locations in which said broadcast signals each include a synchronization signal locked to a common time at time of transmission and further enabled to calculate the location of said apparatus using time differences detected amongst respective ones of said synchronization signals in said received broadcast signals.

20. The apparatus of claim 19, wherein said apparatus is a cellular transceiver.

21. The apparatus of claim 20, wherein said known locations are provided by a lookup table in communication with said transceiver.

22. The apparatus of claim 21, wherein said lookup table is in a server responsive to the transceiver.

23. The apparatus of claim 21, wherein said lookup table is in said apparatus.

24. An electronic apparatus enabled to receive broadcast signals from three or more terrestrial transmitter locations, each of said broadcast signals being a retransmission with common synchronization of a signal previously transmitted by a satellite, and further enabled to calculate the location of said apparatus using time differences detected in synchronization between respective ones of said received broadcast signals.

25. A position location system, comprising:
at least three transmitters in which the location of each of the transmitters is known;
non-DTV broadcast signals transmitted from said known transmitter locations, said broadcast signals each including a synchronization signal locked to a common time; and
an apparatus for receiving said broadcast signals and calculating the location of said apparatus using time differences detected amongst respective ones of said received synchronization signals.

26. A position location system, comprising:
at least three transmitters for rebroadcasting a broadcast signal from a satellite in which the location of each of the transmitters is known, said rebroadcast signal transmitted from any one of said three transmitters being commonly synchronized with the rebroadcast signals transmitted from the other transmitters; and
an apparatus for receiving said rebroadcast signals and calculating the location of said apparatus using time differences detected in synchronization between respective ones of said received rebroadcast signals.

* * * * *